(12) United States Patent  
DeWitt et al.

(10) Patent No.: US 6,740,812 B2
(45) Date of Patent: May 25, 2004

(54) ADAPTABLE ELECTRICAL TUBING SYSTEM

(75) Inventors: Donald E. DeWitt, Syracuse, IN (US); Scott A. Garver, Fort Wayne, IN (US)

(73) Assignee: Dekko Technologies, Inc., North Webster, IN (US)

( * ) Notice: Subject to any disclaimer, the term of this patent is extended or adjusted under 35 U.S.C. 154(b) by 0 days.

(21) Appl. No.: 10/124,874

(22) Filed: Apr. 18, 2002

(65) Prior Publication Data

US 2002/0123261 A1 Sep. 5, 2002

Related U.S. Application Data

(63) Continuation-in-part of application No. 09/665,478, filed on Sep. 20, 2000, now Pat. No. 6,395,986.

(51) Int. Cl.[7] .................................................. H02G 3/18
(52) U.S. Cl. .................... 174/65 G; 174/65 R; 16/2.1; 248/56; 439/604
(58) Field of Search ............................. 174/65 G, 64, 174/65 R; 16/2.1; 439/877, 878, 879, 578, 604; 248/56

(56) References Cited

U.S. PATENT DOCUMENTS

| | | | | |
|---|---|---|---|---|
| 3,568,111 A | * | 3/1971 | Dyer et al. ................. | 333/260 |
| 3,819,849 A | * | 6/1974 | Baker .......................... | 174/86 |
| 4,010,998 A | | 3/1977 | Tolnar, Jr. et al. ............ | 339/91 |
| 4,685,173 A | | 8/1987 | Pavur ............................. | 16/2 |
| 4,708,413 A | | 11/1987 | Schroeder .................... | 439/358 |
| 4,797,513 A | | 1/1989 | Ono et al. ................... | 174/153 |
| 4,864,080 A | | 9/1989 | Fochler et al. ................ | 174/65 |
| 5,104,340 A | * | 4/1992 | Elam et al. ................. | 439/604 |
| 5,120,240 A | | 6/1992 | Reider ........................ | 439/352 |
| 5,775,930 A | | 7/1998 | Model et al. ............... | 439/352 |
| 5,967,194 A | | 10/1999 | Martin ....................... | 138/156 |
| 6,081,964 A | | 7/2000 | Mori ........................... | 16/2.2 |
| 6,203,354 B1 | * | 3/2001 | Kuwahara et al. .......... | 439/357 |

* cited by examiner

*Primary Examiner*—Dhiru R Patel
(74) *Attorney, Agent, or Firm*—Taylor Aust, P.C.

(57) ABSTRACT

An electrical assembly, including at least one electrical conductor, a flexible tubing having an end, an inner surface and an outer surface, the tubing loosely carrying at least one electrical conductor therein, a pass-through connector disposed on the end, the pass-through connector having a peripheral surface which is in continuous, intimate physical contact with at least the inner surface or the outer surface, the at least one electrical conductor passing through the pass-through connector and an electrical component connected to the pass-through connector, the electrical component electrically connected with the at least one electrical conductor.

25 Claims, 5 Drawing Sheets

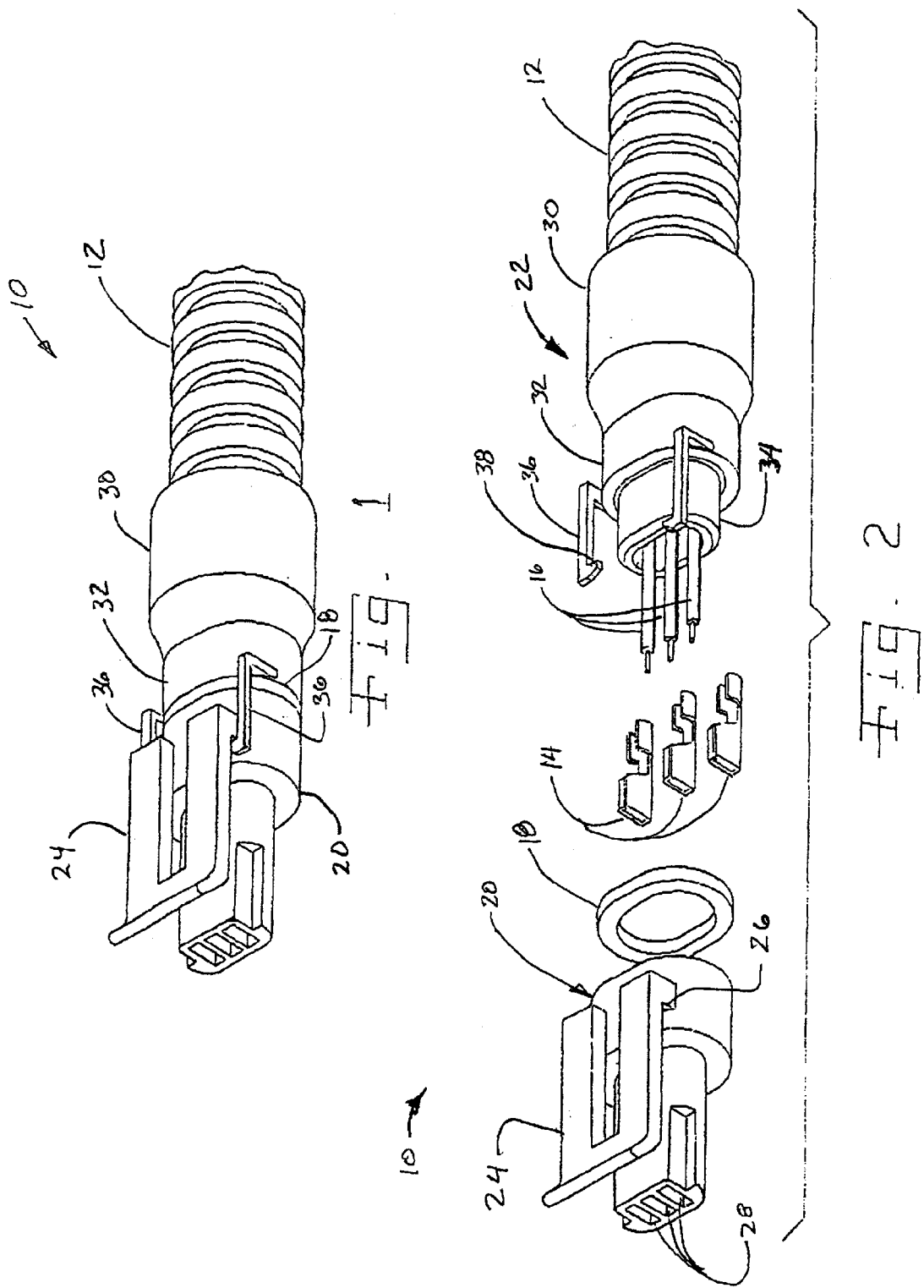

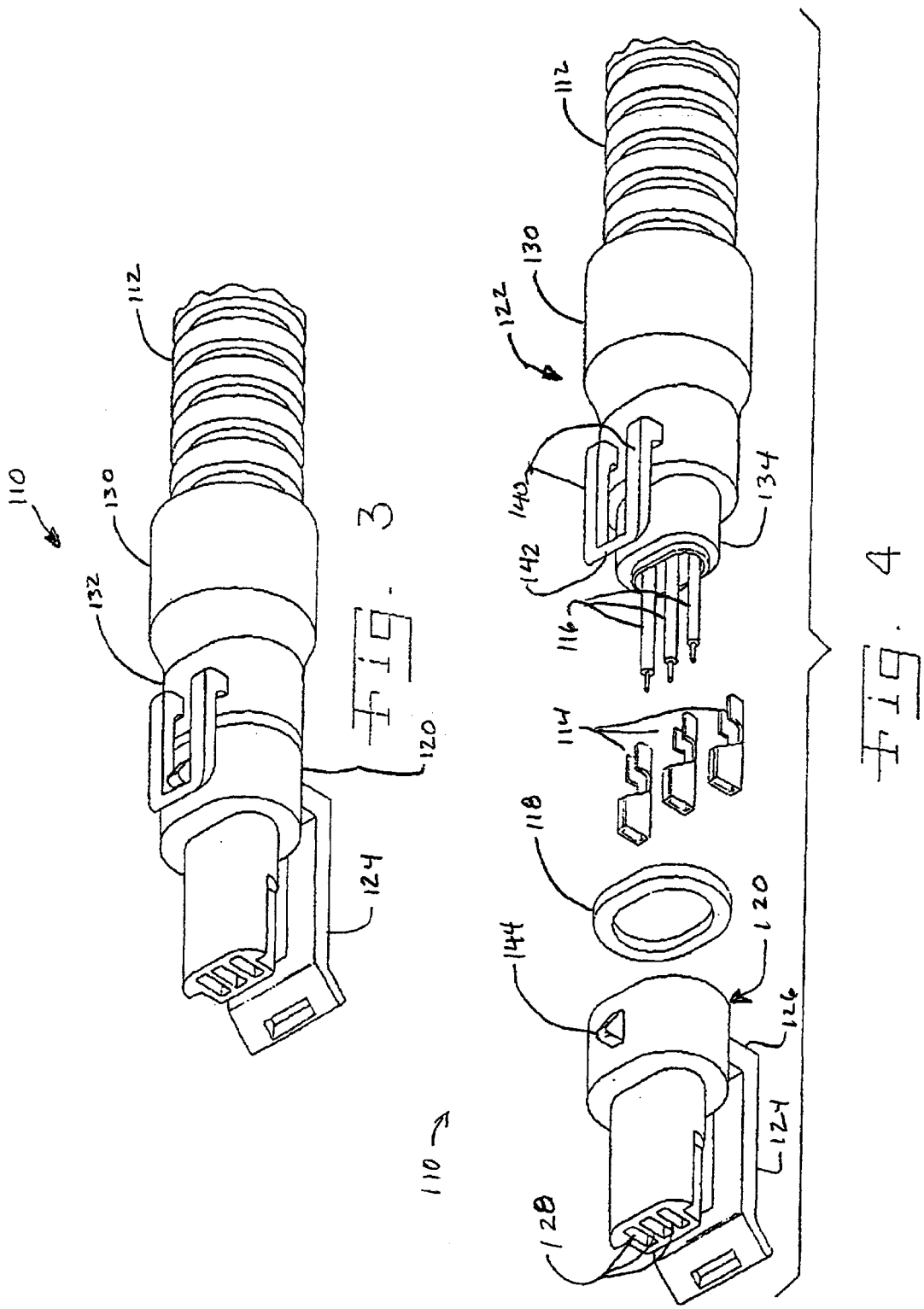

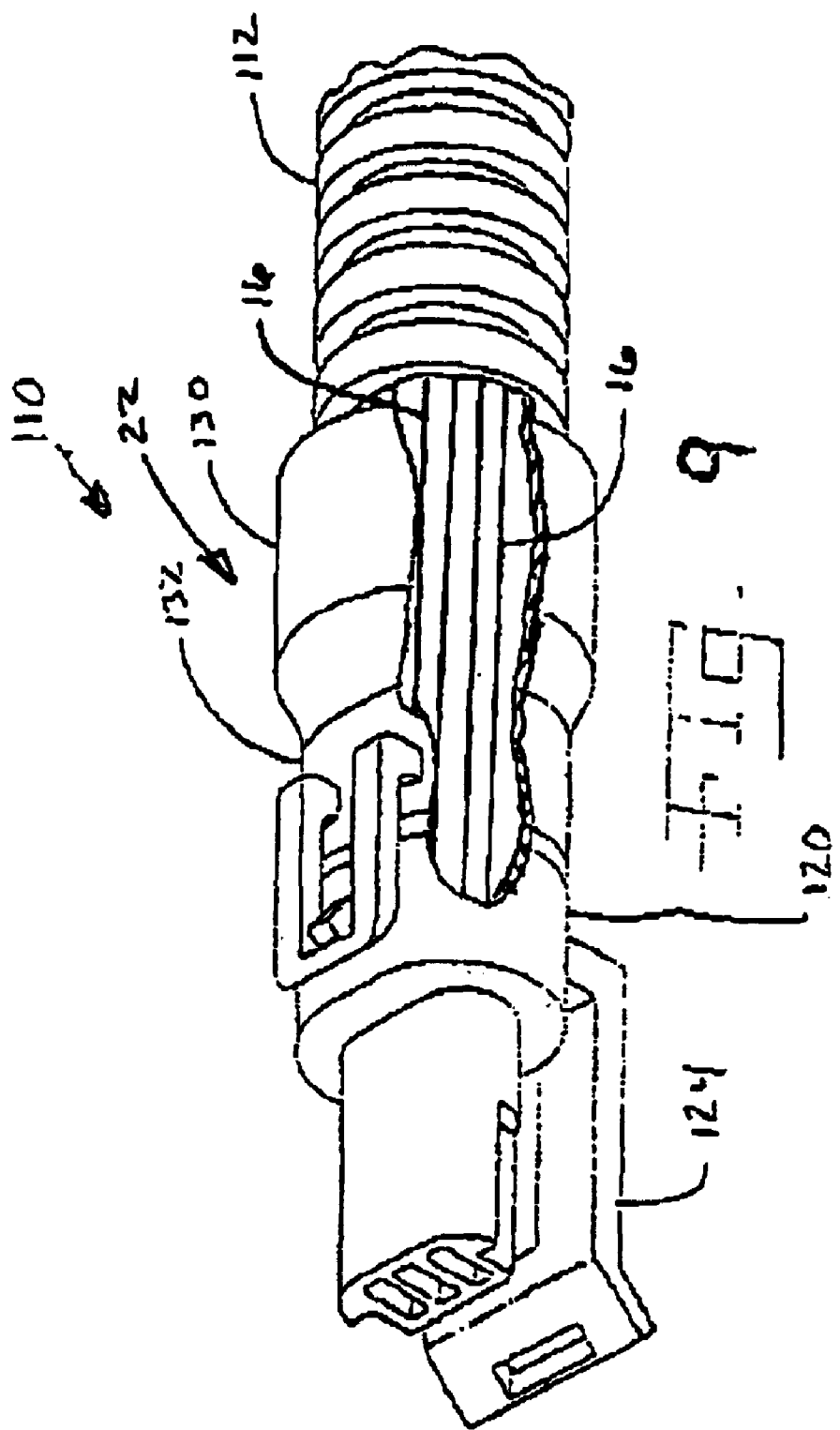

ADAPTABLE ELECTRICAL TUBING SYSTEM

CROSS REFERENCE TO RELATED APPLICATIONS

This is a continuation-in-part of U.S. patent application Ser. No. 09/665,478, entitled "ELECTRICAL CONVOLUTED TUBING WITH OVERMOLDED GROMMET", filed Sep. 20, 2000, now U.S. Pat. No. 6,395,986.

BACKGROUND OF THE INVENTION

1. Field of the Invention

The present invention relates to electrical assemblies, and, more particularly, to adaptable electrical tubing assemblies.

2. Description of the Related Art

An electrical tubing assembly is used to carry electrical conductors from one location to another and protect the electrical conductors from damage caused by mechanical contact such as may occur during impact or vibration. It is known to provide electrical convoluted tubing to carry electrical conductors from one location to another. Electrical convoluted tubing typically includes a plurality of generally parallel, annular convolutions, which allow the tubing to be flexed as it extends from one location to another. The tubing may include a longitudinal split along one side thereof allowing the electrical conductors to be inserted or removed therefrom.

To prevent the convoluted tubing from being physically damaged and thereby possibly damaging the electrical conductors therein, it is also known to carry the convoluted tubing within a rubber grommet positioned within a cut-out in a mounting bracket. For example, electric motors, engines, household appliances, etc. may include mounting brackets for carrying rubber grommets. The grommet is a separate piece, which is first inserted into a cut-out in the mounting bracket. Thereafter, it is necessary to affix the convoluted tubing to the grommet. A problem with this type of assembly is that often times the tubing may be of considerable length to extend between the desired termination locations. It is difficult to handle the tubing when affixing it to the grommet, which results in considerable time being expended to run the electrical conductors from one location to another. Moreover, it is not uncommon to damage the convoluted tubing as a result of the axial force applied thereto trying to attach the tubing to the grommet. Because of these difficulties, it is fairly common to first run the electrical conductors through the various grommets and then merely cut the convoluted tubing to extend between the grommets without going through the grommet. Electrical conductors may therefore be exposed at locations adjacent to the grommets, allowing the conductors to be physically damaged and possibly causing an electrical shorting condition. Long electrical conductors are also frequently damaged through handling around metal enclosures with this assembly method.

Another problem with a tubing assembly, as described above, is that the one or more electrical conductors typically exit the open ends of the tubing, near a location where the corresponding electrical component, to which the electrical conductors are attached, is positioned. It is thus possible for water, dirt or other foreign matter to enter the tubing at the ends thereof The tubing thus does not form an integral assembly with the electrical conductors carried thereby, but rather merely functions to protect the electrical conductors from physical damage as the conductors extend from one termination location to another.

Electrical tubing may be hermetically sealed on each end to prevent dirt and moisture from invading the tubing. However, hermetically sealing of electrical tubing makes it impossible or at least difficult to reseal the tubing after electrical conductors are modified or replaced.

What is needed in the art is a tubing assembly which is adaptable yet hermetically sealed and which may be sold as a preassembled and hermetically sealed unit or as components which may be easily configured and hermetically sealed, thereby reducing assembly costs and inhibiting physical damage to electrical conductors.

SUMMARY OF THE INVENTION

The present invention provides an electrical tubing assembly with an electrical component, such as an electrical connector, plug, etc. at either end thereof, which is associated with electrical conductors passing through the tubing and an overmolded pass-through connector; the combination of the electrical component and pass-through connector hermetically sealing each end of the tubing.

The invention comprises, in one form thereof, an electrical assembly, including at least one electrical conductor, a flexible tubing having an end, an inner surface and an outer surface, the tubing loosely carrying at least one electrical conductor therein, a pass-through connector disposed on the end, the pass-through connector having a peripheral surface which is in continuous, intimate physical contact with at least the inner surface or the outer surface, the at least one electrical conductor passing through the pass-through connector and an electrical component connected to the pass-through connector, the electrical component electrically connected with the at least one electrical conductor.

An advantage of the present invention is that a conventional tubing, such as a convoluted or spiraled tubing is easily and inexpensively transformed into a hermetically sealed assembly for conveying electrical power and/or signals from one point to another.

Another advantage is that the electrical connector or plug is hermetically sealed with the respective end of the tubing using one of a multiplicity of interconnection techniques.

Yet another advantage is that the electrical assembly can be easily reconfigured.

A further advantage is that the electrical components on the ends of the tubing may be replaced without compromising the hermetic seal.

In still another advantage is that overmolding is standardized on the ends of the tubing.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 is a perspective view of an embodiment of an electrical assembly of the present invention;

FIG. 2 is an exploded view of the electrical assembly shown in FIG. 1;

FIG. 3 is a perspective view of another embodiment of the electrical assembly of the present invention;

FIG. 4 is an exploded view of the electrical assembly shown in FIG. 3;

FIG. 9 is a partially sectioned perspective view of the electrical assembly of FIG. 3.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 5:
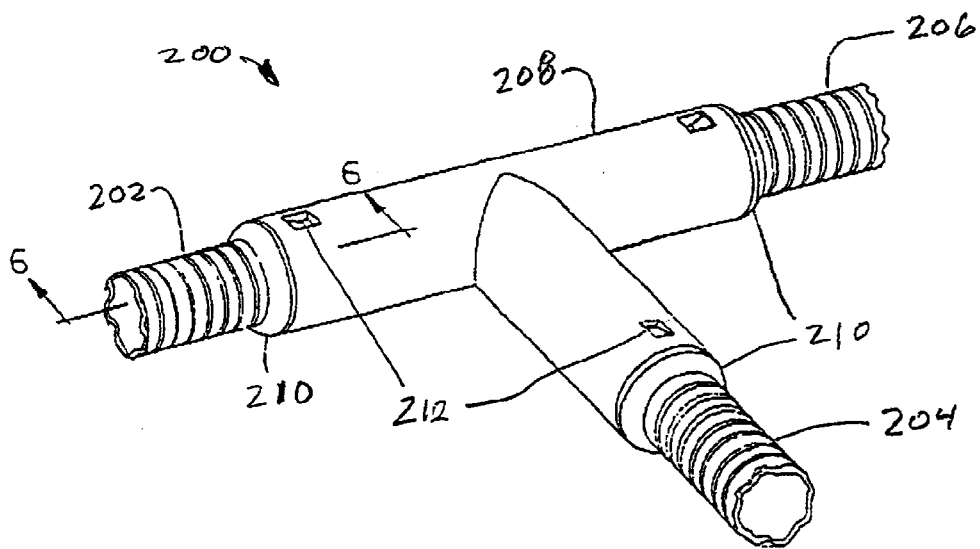
FIG. 5 is a perspective view of another embodiment of the electrical assembly of the present invention.

Referring now to the drawings, and more particularly to FIGS. 1 and 2, there is shown an embodiment of an adaptable electrical tubing system 10 of the present invention, which generally includes convoluted tubing 12, terminals 14, conductors 16, sealing ring 18, electrical component 20 and an overmolded pass-through connector 22.

Convoluted tubing 12 loosely carry conductors 16 therein. Convoluted tubing 12 in the embodiment shown in FIGS. 1 and 2 is in the form of a tubing having a non-smooth outer surface and a non-smooth inner surface. More particularly, convoluted tubing 12 has a plurality of generally parallel, annular convolutions around the outer surface thereof The convolutions thus define a plurality of longitudinally adjacent lands and valleys alternately positioned adjacent to each other along the length of convoluted tubing 12. Convoluted tubing 12 is formed from a flexible material such as plastic with convolutions formed therein. The flexible material and convolutions allow convoluted tubing 12 to be positioned or routed along any desired surface so that conductors 16 will likewise be routed from one location to another. For example, convoluted tubing 12 may be used to carry and protect electrical conductors from a junction box to electrical connections associated with an electric motor, generator or engine.

Terminals 14, as illustrated in FIG. 2, are of a conventional form having either crimp or soldered connections, which connect with conductors 16. Terminals 14 are shaped to interact with electrical connector 20, thereby providing electrical interconnections therethrough. Terminals 14 are hermetically interconnected with electrical connector 20.

Conductors 16 are routed through convoluted tubing 12, overmolded pass-through connector 22 and are connected to terminals 14. Conductor 16 provide for the electrical conveyance of power or signals therethrough. While conductors 16 and terminals 14 are illustrated and discussed herein as electrical conductors and terminals, as an alternative, fiberoptic conductors and optic terminations thereof can also be utilized in the tubing systems disclosed herein.

Sealing ring 18 is provided between electrical connector 20 and overmolded pass-through connector 22. Sealing ring 18 is made from a compressible material, such as rubber or elastomeric polymer. Alternatively, sealing ring 18 may be an O-ring positioned in a groove on the inner surface of electrical connector 20, which interfaces, with an interconnection surface 34 of pass-through connector 22.

Electrical component 20 is illustrated in FIGS. 1 and 2 in the form of an electrical connector 20, which includes a first locking mechanism 24, a shoulder 26 and terminal openings 28. Electrical connector 20 is configured to coact with sealing ring 18 and overmolded pass-through connector 22 to provide a hermetic seal when assembled. Electrical connector 20 receives at least one terminal 14 and provides a hermetic seal between terminals 14 and electrical connector 20. Terminal openings 28 provide for electrical interconnection with an external plug or jack of another assembly or electrical component, not illustrated. Alternatively, electrical connector 20 can be an integral part of another assembly.

First locking mechanism 24 is connected to shoulder 26 and extends from electrical connector 20 in the form of two arms with a bridge across the end, having a slot between the two arms. First locking mechanism 24 interacts with another connector assembly, not shown, for mating with electrical connector 20.

Overmolded pass-through connector 22 includes overmolded portion 30, a reduced neck 32, an interconnection surface 34, a second locking mechanism 36 and a retainer 38. Overmolded portion 30 is coupled with convoluted tubing 12 by way of an insert molding process, such that a portion of overmolded portion 30 is in continuous, intimate physical contact with at least the inner or outer surface of convoluted tubing 12. Conductors 16 are routed through overmolded pass-through connector 22 and convoluted tubing 12 to another end of convoluted tubing 12, also having an overmolded pass-through connector 22 thereon. As can be seen in FIG. 9, conductors 16 travel through pass-through connector 22 without being constrained in any way, as such, they are loosely carried within pass-through connector 22. Conductors 16 then can be configured and interconnected with an electrical component such an electrical connector 20 or alternatively may be connected directly to a junction box or other connector. Overmolded portion 30 interacts with convolutions on convoluted tubing 12 to provide a hermetic and physical connection thereto. Reduced neck 32 is configured to be sized appropriately to Interact with an electrical connector 20. Interconnection surface 34 is sized to be inserted into electrical connector 20 and may provide a sealing surface for an O-ring inserted into connector 20. A second locking mechanism 36 is attached to reduce neck 32 and extends outwardly from overmolded pass-through connector 22 to interact with electrical connector 20 to physically engage and hold in place electrical connector 20. At one end of second locking mechanism 36 is retainer 38, which interacts with shoulder 26 of electrical connector 20 to ensure positioning and locking engagement thereof.

Now, additionally referring to FIGS. 3 and 4, there is shown another embodiment of adaptable electrical tubing system 110 including convoluted tubing 112, terminals 114, conductors 116, sealing ring 118, electrical connector 120 and overmolded pass-through connector 122. Each item in FIGS. 3 and 4, that is similar to an item of FIGS. 1 and 2 is numbered with a similar numbering convention, in which 100 has been added thereto. Additionally, adaptable electrical system 110 includes a second locking mechanism including arms 140, bridge 142 and ramped protrusion 144. Arms 140 are connected to reduced neck 32 at one end and at another end each arm 140 is connected by bridge 142. Arms 140 are generally parallel in nature forming a slot therebetween. As electrical connector 120 is assembled with overmolded pass-through connector 122, bridge 142 contacts a ramped portion of ramped protrusion 144 causing bridge 142 to flex over the top of ramped protrusion 144 to a side opposite the ramped area of ramped protrusion 144, thereby locking electrical connector 120 and overmolded passthrough connector 122 together.

Alternatively, adaptable electrical tubing systems 10 and 110 may omit both a sealing ring and a locking mechanism on pass-through connector 22 or 122; and sealing between pass-through connector 22 or 122, and electrical connector 20 or 120 may be accomplished with an adhesive, a sealant or a heating process.

Adaptable electrical tubing systems 10 and 110 are assembled in the same manner by first overmolding pass-through connector 22 onto at least one end of convoluted tubing 12. Assuming that a pass-through connector 22 has been overmolded on each end of a piece of convoluted tubing 12, conductors 16 are routed through pass-through connector 22, convoluted tubing 12 and another pass-through connector 22. The ends of conductors 16 can be electrically connected to terminals 14 either prior to or after being routed through tubing 12. Terminals 14 are then inserted through sealing ring 18 and into terminal openings 28 by way of the back portion of electrical connector 20. Any extra length of conductors 16 is then pushed back into pass-through connector 22 and into convoluted tubing 12. Electrical connector 20 is then oriented as shown in FIGS. 2 and 4 and is lockingly engaged, by way of a locking mechanism, with pass-through connector 22, thereby compressing sealing ring 18 and sealing the assembly.

Adaptable electrical tubing system 10 can be supplied as separate components for customization or as complete assemblies. The wiring in adaptable electrical tubing system 10 is readily modified or repaired by disengaging the locking mechanism, changing a conductor and reassembling adaptable electrical tubing system 10.

Figure 6:
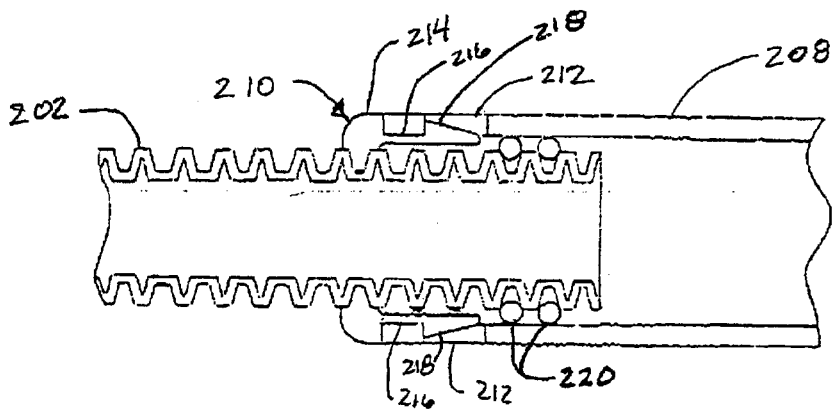
FIG. 6 is a sectional view of the electrical branch assembly shown in FIG. 5, taken along line 6—6 in FIG. 5.
Figure 7:
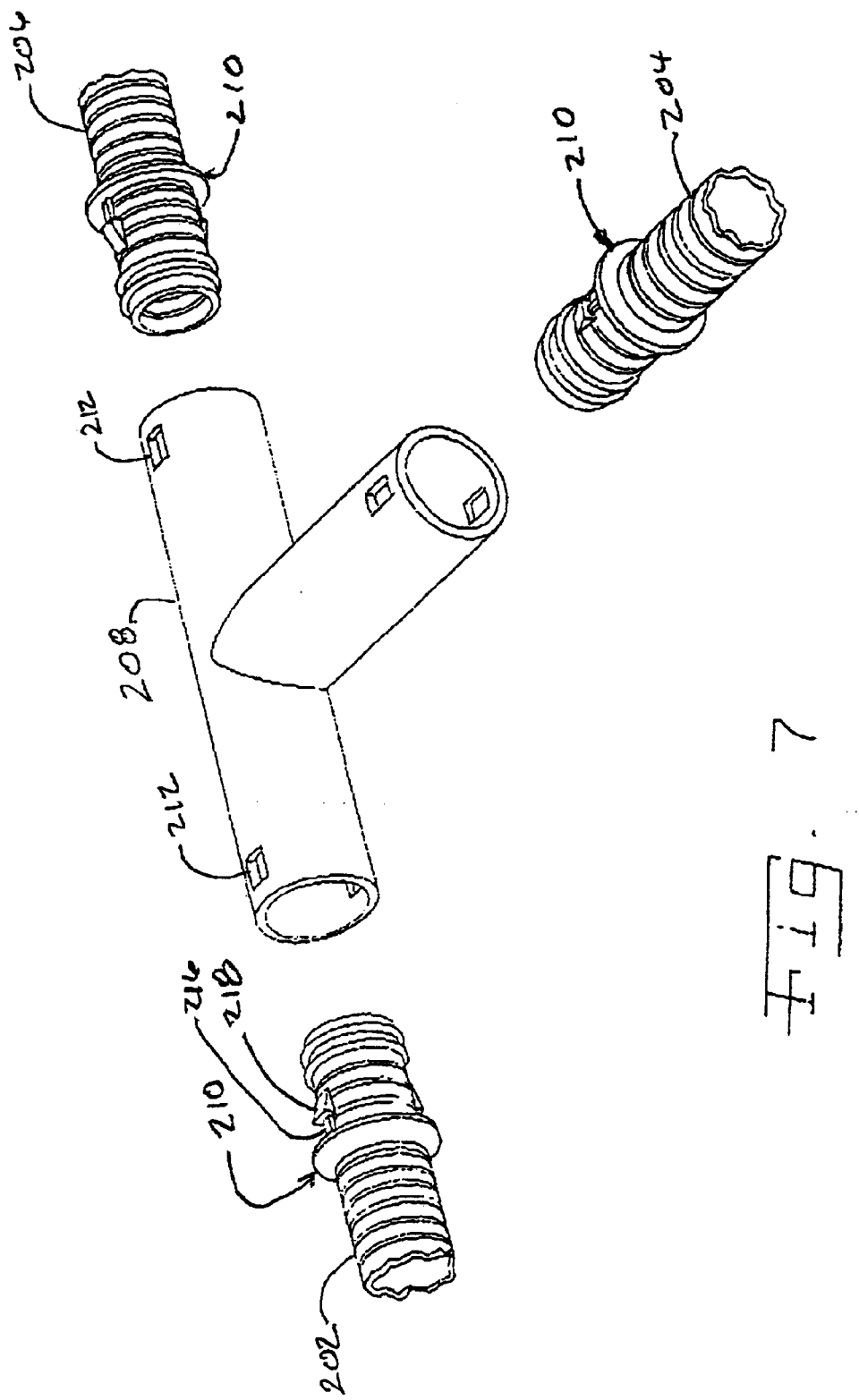
FIG. 7 is an exploded view of the electrical assembly shown in FIGS. 5 and 6.

Now, additionally referring to FIGS. 5, 6 and 7 there is illustrated a tubing branch assembly 200 including convoluted tubing 202, 204 and 206, branch tube 208 and retainer 210. Convoluted tubing 202, 204 and 206 are three separate pieces of convoluted tubing, each having a retainer 210 located thereon. Branch tube 208 includes a plurality of retaining notches 212. Branch tube 208, as illustrated, is in a T configuration allowing conductors 16 to be routed and split into different directions. Branch tube 208 may be made from a non-conductive material such as plastic or any other suitable rigid or semi-rigid material. At least one retaining notch 12 is located at a spaced position in from each end of branch tube 208. Retaining notches 212 are configured to receive a retaining portion of retainer 210.

Retainer 210 includes shoulder 214, a plurality of connecting portions 216 and a plurality of retaining portions 218. Shoulder 214 is the approximate outside diameter of branch tube 208. A portion of each retainer 210 sets in a bottom valley of convoluted tubing 202, 204 or 206 and is retained therein. Shoulder portion 214 of retainer 210 prevents retainer 210 from entering tube 208. Connecting portion 216 connects ramped retaining portion 218 to the body of retainer 210. Retaining portion 218 has a ramped portion, which facilitates the insertion thereof into branch tube 208. On the outer surface of convoluted tubing 202, 204 or 206 are two elastomeric seals 220, which may be o-rings, positioned in the grooves of convoluted tubing 202, 204 or 206, which are inserted into and interact with the body of branch tube 208 to provide a hermetic seal therebetween. Once ramped retaining portion 218 is inserted into branch tube 208, ramped retaining portion 218 is oriented to interact with notch 212 providing a removable connection between convoluted tubing 202, retainer 210 and branch tube 208. To remove and reconfigure tubing branch assembly 200, ramped retaining portions 218 may be depressed, thereby allowing withdraw of convoluted tubing 202, 204 or 206 from branch tube 208. The flexibility of convoluted tubing 202, 204 or 206 coacts with ramped retaining portion 218 causing ramped retaining portion 218 to be locked into position within notches 212.

To assemble tubing branch assembly 200, retainer 210 is first installed onto convoluted tubing 202, such that a portion of retainer 210 is secured in a valley of convoluted tubing 202. Next, at least one O-ring 220 is situated between lands of convoluted tubing 202. The assembly, thus far described, is then oriented and slid into branch tube 208 so that retaining portions 218 engage notches 212. The flexibility of convoluted tube 202 coacts with retaining portions 218 to keep retaining portions 218 engaged in notches 212. Likewise the flexibility also coacts with O-rings 220 to provide a seal between convoluted tubing 202 and branch tube 208. Either before or after insertion of tubing 202 into branch tube 208 conductors 16 may be routed through the assembly to electrical connector 20. Disassembly of tubing branch assembly 200 is accomplished by depressing retaining portions 218 and removing tubing 202 from branch tube 208.

Figure 8:
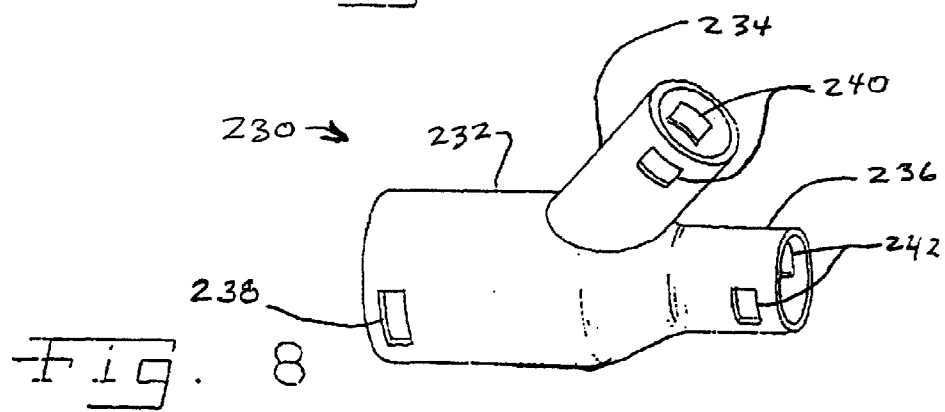
FIG. 8 is a perspective view of another embodiment an electrical branch component of the present invention.

Referring, additionally, now to FIG. 8 there is shown a reducing branch tube 230 including a large section 232, a first reduced section 234 and a second reduced section 236. Large section 232, first reduced section 234 and second reduced section 236 each have retaining notches 238, 240 and 242, respectively. Reducing branch tube 230 allows for the interconnection of different sizes of convoluted tubing. As illustrated in FIG. 8, convoluted tubing which interacts with large section 232 is of a larger diameter than the convoluted tubing which interacts with first reduced section 234 and second reduced section 236, thereby allowing electrical circuits to be branched to a plurality of locations.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical assembly, comprising:
    at least one electrical conductor;
    a flexible tubing having an end, an inner surface and an outer surface, said tubing loosely carrying said at least one electrical conductor therein;
    a pass-through connector disposed on said end, said pass-through connector having a peripheral surface which is in continuous, intimate physical contact with at least one of said inner surface and said outer surface, said at least one electrical conductor passing through said pass-through connector, said at least one electrical conductor unattached to said pass-through connector; and
    an electrical component connected to said pass-through connector, said electrical component electrically connected with said at least one electrical conductor.

2. The assembly of claim 1, further comprising a sealing ring disposed between a surface of said pass-through connector and a surface of said electrical component, thereby providing a hermetical seal between said pass-through connector and said electrical component.

3. The assembly of claim 1, further comprising a plurality of terminals, each of said plurality of terminals connected to an end of a corresponding said electrical conductor, said terminals insertable into said electrical component.

4. The assembly of claim 1, further comprising an other pass-through connector and an other electrical component, said other pass-through connector disposed on an other end of said flexible tubing, said other electrical component connected to said at least one electrical conductor, said other electrical component in hermetically sealing contact with said other pass-through connector.

5. The assembly of claim 1, wherein said electrical component is in hermetically sealing contact with said pass-through connector.

6. The assembly of claim 1, wherein said pass-through connector has an inner surface which is at least partially in continuous, intimate physical contact with said outer surface of said flexible tubing.

7. The assembly of claim 1, wherein said pass-through connector is in hermetically sealing contact with said flexible tubing.

8. An electrical assembly, comprising:
  at least one electrical conductor:
  a flexible tubing having an end, an inner surface and an outer surface, said tubing loosely carrying said at least one electrical conductor therein:
  a pass-through connector disposed on said end, said pass-through connector having a peripheral surface which is in continuous, intimate physical contact with at least one of said inner surface and said outer surface, said at least one electrical conductor gassing through said pass-through connector; and
  an electrical component connected to said pass-through connector, said electrical component electrically connected with said at least one electrical conductor, said pass-through connector includes a locking mechanism for detachably locking said electrical component thereto.

9. An electrical assembly, comprising:
  at least one electrical conductor;
  a flexible tubing having an end, an inner surface and an outer surface, said tubing loosely carrying said at least one electrical conductor therein;
  a pass-through connector disposed on said end, said pass-through connector having a peripheral surface which is in continuous, intimate physical contact with at least one of said inner surface and said outer surface, said at least one electrical conductor passing through said pass-through connector; and
  an electrical component connected to said pass-through connector, said electrical component electrically connected with said at least one electrical conductor, said electrical component having a surface with a locking mechanism located thereon.

10. An electrical assembly, comprising;
  at least one electrical conductor;
  a plurality of flexible tubes loosely carrying said at least one electrical connector therein, each said plurality of flexible tubes having an end;
  a plurality of retainers, at least one of said plurality of retainers disposed on each of said plurality of flexible tubes proximate said end of said plurality of flexible tubes; and
  a branch tube having a plurality of ends, each said end of said branch tube receiving said end of one of said plurality of flexible tubes, at least one of said plurality of retainers detachably engaging said branch tube.

11. The assembly of claim 10, further comprising at least one elastomeric sealing ring, each said elastomeric sealing ring disposed around and proximate to said end of one of said plurality of flexible tubes, said elastomeric sealing ring configured to be in compression against an inner surface of said branch tube.

12. The assembly of claim 10, wherein said branch tube includes at least one notch located proximate each end of said branch tube, each of said plurality of retainers detachably engaging a corresponding said at least one notch.

13. The assembly of claim 12, wherein said plurality of flexible tubes have a flexible property which coacts with said plurality of retainers to detachably engage said corresponding notch.

14. The assembly of claim 10, wherein said ends of said branch tube include a first end having a first diameter and a second end having a second diameter, said first diameter differing from said second diameter.

15. The assembly of claim 10, wherein said at least one electrical conductor is a plurality of electrical conductors each being directed through said branch tube and through at least two of said plurality of tubes.

16. The assembly of claim 10, further comprising at least one pass-through connector disposed on an other end of at least one of said plurality of flexible tubes, said pass-through connector having a peripheral surface which is in continuous, intimate physical contact with at least one of an inner surface and an outer surface of one of said plurality of flexible tubes.

17. The assembly of claim 16, further comprising an electrical component connected to said at least one electrical conductor, said electrical component in hermetically sealing contact with said pass-through connector.

18. The assembly of claim 10, wherein at least one of said plurality of flexible tubes is in hermetically sealing contact with a corresponding one of said plurality of ends of said branch tube.

19. A tubing system for carrying at least one electrical conductor therein, comprising:
  a flexible tubing having an end, an inner surface and an outer surface;
  a pass-through connector disposed on said end, said pass-through connector having a peripheral surface which is in continuous, intimate physical contact with at least one of said inner surface and said outer surface; and
  an electrical component in hermetically sealing contact with said pass-through connector, at least one of said pass-through connector and said electrical component having a locking mechanism thereon.

20. The system of claim 19, further comprising a sealing ring disposed between a surface of said pass-through connector and a surface of said electrical component.

21. The system of claim 19, further comprising a plurality of terminals, each of said plurality of terminals connected to an end of one of said at least one electrical conductor, said terminals insertable into said electrical component.

22. The system of claim 19, further comprising an other pass-through connector and an other electrical component, said other pass-through connector disposed on an other end of said flexible tubing, said other electrical component connected to the at least one electrical conductor, said other electrical component in hermetically sealing contact with said other pass-through connector.

23. A method for assembling an electrical tubing system, comprising the steps of:

overmolding a pass-through connector onto an end of flexible tubing such that said pass-through connector is in intimate physical contact with at least a portion of said flexible tubing;

engaging said pass-through connector in a hermetic manner with an electrical component; and locking said pass-through connector to said electrical component by way of a locking mechanism on at least one of said pass-through connector and said electrical component.

24. The method of claim 23, further comprising the steps of:

inserting at least one conductor through said flexible tubing and said pass-through connector; and electrically connecting an end of said at least one conductor to said electrical component.

25. The method of claim 23, wherein said overmolding step includes hermetically fixing said pass-through connector to said flexible tubing.

* * * * *

UNITED STATES PATENT AND TRADEMARK OFFICE
CERTIFICATE OF CORRECTION

PATENT NO. : 6,740,812 B2
DATED : May 25, 2004
INVENTOR(S) : De Witt et al.

It is certified that error appears in the above-identified patent and that said Letters Patent is hereby corrected as shown below:

Column 4,
Line 32, after the word "such", please delete "an" and substitute therefore -- as --; and
Line 36, please delete "Interact", and substitute therefore -- interact --.

Column 7,
Line 27, please delete "gassing", and substitute therefore -- passing --.

Signed and Sealed this

Twenty-fourth Day of May, 2005

JON W. DUDAS
*Director of the United States Patent and Trademark Office*